UNITED STATES PATENT OFFICE.

JEAN CHARLES OCTAVE CHEMIN, OF PARIS, FRANCE.

PROCESS OF PREPARING OZOCERITE AND OTHER SOLID HYDROCARBONS.

SPECIFICATION forming part of Letters Patent No. 297,766, dated April 29, 1884.

Application filed July 28, 1883. (No specimens.)

*To all whom it may concern:*

Be it known that I, JEAN CHARLES OCTAVE CHEMIN, a citizen of the French Republic, residing at Paris, France, have invented certain Improvements in the Process of Preparing Ozocerite and other Solid Hydrocarbons, of which the following is a specification.

My object is to purify and bleach ozocerite, paraffine, and other solid or semi-solid hydrocarbons in order to fit them for waxing floors, furniture, &c., and for use in the arts, as in the manufacture of harness, &c.

In carrying out my invention where ozocerite, for example, is to be treated, I employ the process I will now describe, which I divide into steps, as follows:

First. Ozocerite in the raw or crude state has a marked tendency to become darker when heated above its point of fusion. To facilitate the bleaching of this substance by my process, I melt the crude material in water heated to and maintained at a temperature of 70° centigrade. The earthy and solid impurities contained in it fall to the bottom of the melting-vessel. On decanting and cooling, I thus obtain a product much less colored than the commercial product and well suited to undergo the further operations of the process.

Second. The ozocerite, prepared as above described, is placed in a retort to which direct heat may be applied, and in which is arranged suitable apparatus for injecting superheated steam. When the substance is melted, I add flowers of sulphur in the proportion of five to fifteen per centum, the proportion varying somewhat above and below these limits, according to the nature and character of the ozocerite. The heating of the retort and the application of the superheated steam to its contents may be effected in any of the ways well known in stearine-works. The distillation effected is not fractional. The distillate is yellow, homogeneous, and without fluorescence or dichroism. It crystallizes by slow cooling, and is in excellent condition to be submitted to the after steps of the process. The immediate yield is from ninety-two to ninety-five per centum of the material submitted to distillation.

Third. For this step in the process I may employ either of the two modes following: (*a.*) The distillate above described is run into molds, such as are employed in stearine-works. The cakes obtained are submitted to heat and pressure, the platens of the press being maintained at a temperature of from 35° to 50°. This pressure expels the major part of the oils and hydrocarbons fusible at low temperature. (*b.*) The distillate reduced to powder by any known means—as by insufflation, for example—is introduced into a hydro-extractor, which is maintained at a temperature of from 40° to 50° centigrade. Into this extractor water heated to from 45° to 60° is introduced as a spray. This spray facilitates the extraction of the oils and hydrocarbons fusible at low temperatures. The above operation may be effected at the ordinary temperature by substituting for the hot water amylic alcohol or any other known solvent of oils and liquid hydrocarbons.

Fourth. The product obtained by either of the steps *a* and *b* is fused in a hot-water bath (bain-marie) at a temperature of 65° to 70°. Amylic alcohol to the amount of about twenty per centum is then incorporated, this mixture vigorously stirred to insure a thorough mixture, and the substance is run into molds and allowed to cool. These solid blocks are then submitted to pressure in a hydraulic press, and the cakes from the press are melted and allowed to digest during about four hours with animal charcoal. During all this time the mixture of animal black and ozocerite is stirred vigorously, and when the digestion is finished the substance is filtered through animal charcoal. The product thus obtained is, when cooled, perfectly white, hard, and sonorous, and comprises from seventy-nine to eighty-one per centum of the product submitted to distillation. The liquids yielded by this last operation, as well as those which result from the treatment with amylic alcohol or other solvents, are distilled to recover said alcohol or other solvents, which may be used again. The residue is mixed with new charges of the material, to be subsequently treated, and thus all waste is practically avoided.

To render the operations still easier, I have found advantage in mixing the ozocerites with the residues from Pennsylvania petroleum or naphtha. The proportions will vary somewhat, according to the circumstances; but a medium proportion is from seventy to eighty per centum of ozocerite to from twenty to thirty per centum of the petroleum residue. The yield in this case will be somewhat modified from the figures given above.

My above-described process is adapted not only to the treatment of ozocerite, but to all solid or semi-liquid hydrocarbons—as, for example, residues of petroleum and naphtha, tars of all kinds, distillates from bituminous schists, &c., which substances may be purified and bleached thereby. In the first step of my process when applied to many of these substances, it is well to employ filter-presses provided with the well-known Mirandaz apparatus, which introduces the substance into the filters.

The action of the sulphur in my process is somewhat difficult to explain. I have established the fact experimentally that it acts most powerfully as a decolorizing agent when the ozocerite is melted at its lowest temperature. Therefore I have indicated the fusion with a bain-marie at a temperature of 70° centigrade. In all the reactions the sulphur acts as much by its presence as by reason of the combinations to which it gives rise. When used with the molten ozocerite, it is necessary to mix it uniformly through the molten mass. At the beginning of the distillation the gaseous products expelled by the current of superheated steam contain a notable proportion of sulphureted hydrogen, and when the disengagement of this gas ceases, it is replaced by polysulphurets, likewise gaseous, and having characteristic odors. Of these I have not been able yet to determine the exact composition. The product of the distillation contains only traces of sulphur, or perhaps sulphurets. It is known that hydrocarbons dissolve a certain proportion of this metalloid. When flower of sulphur is mixed with molten ozocerite, (without distillation,) it passes through the mass by reason of its gravity, and falls to the lower part of the vessel. The sulphur in this case acts only by its presence, and when the mass is cooled and decanted it will be found that the ozocerite has changed its color from a red-brown to an ocher-yellow. The higher the temperature at which the ozocerite has been fused the less pronounced will be the decolorizing effect of the sulphur.

I am aware that amylic alcohol has been employed in treating hydrocarbons, and I make no claim to this.

Having thus described my invention, I claim—

1. The herein-described method of treating or preparing ozocerite and other similar hydrocarbons, which consists in first removing the earthy insoluble impurities by the means substantially as described, then heating the thus purified substance in a retort in connection with sulphur in about the proportions specified, and submitting the same to the action of superheated steam in the retort until it distills over, substantially as set forth.

2. The herein-described method of treating or preparing ozocerite and other similar hydrocarbons, which consists in first removing the earthy insoluble impurities, substantially as described, then distilling the thus purified hydrocarbon in combination with flowers of sulphur, substantially as specified, and then removing the oils and lighter hydrocarbons in the manner described, substantially as and for the purposes set forth.

3. The herein-described method of purifying and bleaching ozocerite and similar hydrocarbons, which consists in first removing the earthy insoluble impurities, as herein set forth; second, distilling the thus purified hydrocarbon mixed with flowers of sulphur in about the proportions specified; third, removing the oils and lighter hydrocarbons by heat and pressure, or the specified equivalent of the same; fourth, fusing in a bath with amylic alcohol, cooling and pressing, digesting with animal charcoal while in a molten state, and finally filtering through animal charcoal, substantially as set forth.

In witness whereof I have hereunto signed my name in the presence of two subscribing witnesses.

JEAN CHARLES OCTAVE CHEMIN.

Witnesses:
EDWARD P. MACLEAN,
AMAND RITTER.